April 5, 1955     D. B. BRADNER     2,705,436
MICRO-REPRODUCTION PROJECTION CARDS
Filed June 28, 1951
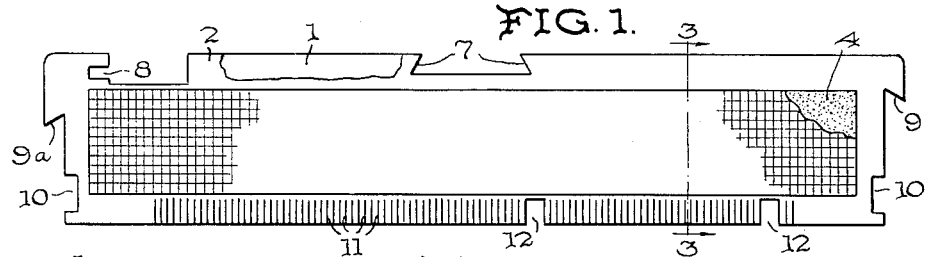
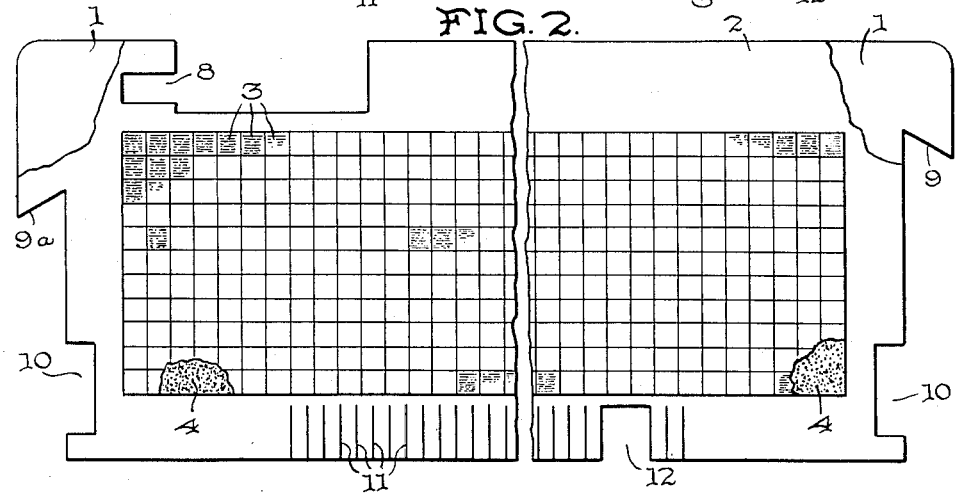
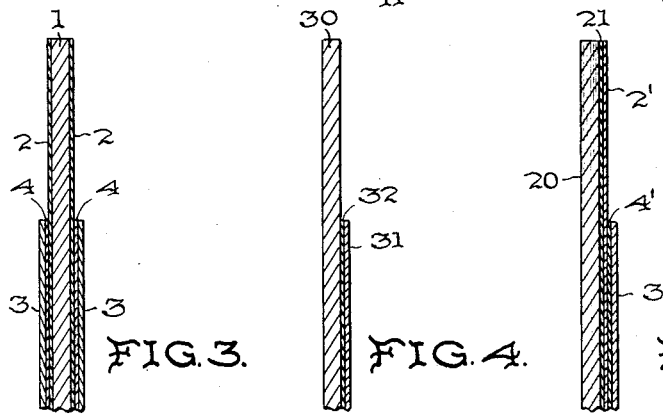
INVENTOR.
DONALD B. BRADNER
BY Pennie, Edmonds,
Morton, Barrows and Taylor
ATTORNEYS

United States Patent Office 2,705,436
Patented Apr. 5, 1955

2,705,436

MICRO-REPRODUCTION PROJECTION CARDS

Donald B. Bradner, Wilmington, Del.

Application June 28, 1951, Serial No. 234,004

11 Claims. (Cl. 88—24)

This invention relates to cards having micro-reproductions secured thereto for projection onto a screen by reflected light, and more particularly to such cards embodying a material of high heat conductivity.

Micro-reproductions are commonly made on transparent films or plates, for projection by transmitted light, or on opaque material, supported on cardboard or the like, for projection by reflected light. In either case, it requires the use of an intense light concentrated in a small area to project satisfactorily such small reproductions. Despite the use of filters to absorb heat from the light source and special cooling devices in projectors, the heat resulting from the incident light is so great on micro-reproductions smaller than those having an area of less than about .1 sq. in. that they cannot be stopped for any substantial length of time for stationary viewing without the heat causing distortion or other damage to the reproductions. Present methods for avoiding this difficulty include taking an enlarged photograph of the desired reproduction by means of high speed photography and using the relatively large resulting photograph for stationary viewing, or reducing the light intensity on the desired reproduction and viewing it in a darkened room.

The present invention contemplates a base or supporting member for micro-reproductions to be viewed by reflected light which is of such structure that the intense heat incident to the projection of the micro-reproduced matter is so rapidly dissipated from the region of any particular micro-reproduction during the projection thereof that micro-reproductions, only a small fraction of the area of those referred to above, may be projected by reflected light for viewing without burning or other damage or injury thereto. For example, micro-reproductions having an area of the order of .005 sq. in. may be projected by reflected light for a length of time sufficient for the reading of a page of printed matter without any injury or damage whatever. Consequently, twenty or more times as many micro-reproductions than heretofore have been possible may be placed on a support of any given area for projection by reflected light.

More particularly, the present invention contemplates a card embodying a member of high heat conductivity, such as aluminum, steel, or other suitable material, to which are secured the small micro-reproductions to be projected by reflected light.

The micro-reproductions are secured in good heat-conducting relationship to the member of high heat conductivity so that the intense heat from the incident light on any one micro-reproduction, which is of exceedingly small area compared to that of the member, is transmitted to and absorbed by the relatively large surrounding mass of the member and rapidly conducted away from the particular micro-reproduction being projected and dissipated to the surrounding atmosphere before the micro-reproduction reaches a temperature which would cause distortion or other damage thereto. As contemplated by the invention, each micro-reproduction may have an area only a small fraction of one percent of that of the surface of the heat-conducting member to which it is secured.

The invention will be further described in connection with the accompanying drawings, but it is to be understood that such further description is by way of exemplification and the invention is not limited thereto except to the extent specifically set forth in the subjoined claims.

In the drawings:

Fig. 1 is a front view of a card embodying the invention,

Fig. 2 is a view similar to Fig. 1, on an enlarged scale and with the middle portion broken away, Fig. 3 is a sectional view along line 3—3 of Fig. 1, and having the middle portion broken away.

Fig. 4 is a sectional view similar to Fig. 3 of a card embodying a modified form of the invention, and having the middle portion broken away, Fig. 5 is a sectional view similar to Fig. 3 of a card embodying another modified form of the invention and having the middle portion broken away.

Referring to the drawings, and first to the forms of the invention shown in Figs. 1 to 3, the card comprises a base member 1 of high heat conductivity, preferably thin sheet aluminum or hardened steel such as is commonly used in safety razor blades, coated with a thin layer of a material 2 having high light reflectivity such as white enamel.

Micro-reproductions 3 are secured, in rows, and with good surface contact, to the coating 2 by a thin layer of an adhesive 4. The micro-reproductions may be micro-films, micro-photographs or other micro-reproduced matter which it is desired to project, by reflected light, with ample magnification to enable them to be easily read or viewed. When the reproductions are micro-films or the like, it is necessary that the adhesive 4 have good light-reflecting or light-transmitting properties so that during reflection the light will be transmitted through the transparent or translucent portion of the film, through the adhesive, if it is translucent, and be reflected by the enamel coating 2 or be reflected by the adhesive, if it is light reflective. The enamel coating 2 and the layer of adhesive 4 should be sufficiently thin that the conductance therethrough of heat, caused by the intense light impinging on the micro-reproductions, to the underlying metallic base member for dissipation will be sufficient to avoid damage to the micro-reproductions.

In the reflected-light projection of micro-reproductions, it is necessary that provision be made for rapidly conducting the heat away from the micro-reproductions, and therefore that the area of any one micro-reproduction be exceedingly small compared to the area of the heat-conducting member. The area of each micro-reproduction should be less than 1% of the area of the heat-conducting member and preferably less than about 0.1% thereof, and may be as little as about 0.05% of the area of the surface of the heat-conducting member to which it is secured.

Fig. 2 better shows the specific positioning of the micro-reproductions 3 on the card. These reproductions are arranged horizontally and vertically in rows so that when the micro-reproductions are of the pages of a book, or the like, those setting forth the title, the table of contents, the index, etc., will occupy the top row; those of pages 1 to 100 the second row; those of pages 101 to 200 the third row; and so forth, throughout the eleven horizontal rows on the front side of the card. On each card the reproduction of any particular page of a book, e. g. page 205 will be found in exactly the same location, and will be the fourth print down in the fifth vertical row from the left side of the card, that is, at the intersection of the fourth horizontal row from the top and the fifth vertical row from the left of the card.

As is shown in Fig. 3, the micro-reproductions may be mounted on the back as well as on the front of the card. The arrangement of the pictures on the back of the card will be the same as that on the front. Consequently, microreproductions of as many as 2000, or even more pages of a book may be carried on a single card. Alternately, one side of the card reserving the top row on each side for the title, index, etc., pages may carry micro-reproductions of the pages of one book and the other side may carry micro-reproductions of the pages of a second book, provided, of course, that neither of the books contains a number of pages, including title, index, etc. pages, greater than the number of micro-reproductions which may be secured to one side of the particular card.

The cards are formed from sheet material having good heat-conductive properties, and may be about 0.009 in. thick. They are all cut to exactly the same size, preferably 6.75 in. long and 1.3 in. wide.

The card as shown in Figs. 1 and 2 is formed with dovetail notches 7, an opening 8, shoulders 9 and 9a, recesses 10, slits 11 and selecting notches 12, all of which perform particular functions when the card is used in connection with the aforementioned card selector mechanism.

In preparing the cards, such as to carry micro-reproductions of a book, separate photographs are taken of the pages of the book on, for example 16 mm. or 35 mm. film and the resulting reproductions assembled on a panel in vertical and horizontal rows, the vertical rows containing eleven reproductions and the horizontal rows containing one hundred reproductions each. The panel is then photographed to give a negative about six inches long and somewhat less than one inch wide from which a contact print is made, preferably on cellophane or other suitable transparent or translucent material. The resulting print will contain eleven hundred micro-photographs, each being approximately 0.06 in. wide and 0.08 in. high. The print containing the eleven hundred micro-reproductions is then secured in good surface contact to the base member 1, preferably by a thin layer of the adhesive 4. The print is so positioned relative to the edges of the card that each micro-reproduction will occupy a particular location on the card, and so that, in any group of cards made in accordance with the invention, page 205, of a book, for instance, will be at the same location on any card of the group.

If micro-reproductions are to be carried by the back of the card, they are prepared and secured to the card in the same manner.

As stated above, the card is used for reflected-light projection and during such projection is positioned in a projector so that the light is focused upon the desired part of the card. The focusing of the light and the positioning of the card relative to the focused light must be very accurate because of the smallness of the micro-reproductions and because each micro-reproduction occupies a particular location on the card, as explained above. The incident light is in part reflected and in part absorbed as heat by the micro-reproduction and enameled surface. The heat thus absorbed by any single micro-reproduction and the underlying enamel during the projection of the micro-reproduction will be localized at a very small area of the heat-conducting base. The surrounding portions of the base member will be at a much lower temperature. Consequently, the heat at the focal point will be rapidly conducted to the surrounding portions of the base and dissipated to the surrounding atmosphere. Such conducting of the heat from the micro-reproduction being projected and the underlying enamel will be so rapid that the micro-reproduction will never reach a temperature at which it will be distorted or otherwise damaged.

In a modified form of the invention shown in Fig. 4, the card comprises a base member 30 of high heat conductivity to which are secured micro-reproductions 31 by a thin coating of a material having adhesive properties. When the micro-reproductions are transparencies, the thin coating 32 is a material having high light-reflectivity, as well as adhesive properties, such as a thermoplastic white enamel.

In attaching the micro-reproductions to the base member, the adhesive may either be spread on the base member and the micro-reproductions secured thereto, or the adhesive may first be spread onto the back surface of the micro-reproductions and the micro-reproductions then secured to the base member.

In another modified form of the invention, shown in Fig. 5, the card is of laminated structure, comprising a supporting member 20 to which is secured a thin sheet 21 having good heat-conducting properties. The supporting member 20 may be formed from specially calendared paper or cardboard such as is commonly used for forming cards for use in existing card selecting systems. However, it must possess sufficient rigidity to adequately support the foil sheet 21. The sheet 21 preferably is aluminum or other foil having high heat conductivity and preferably is coated with a thin layer of white enamel 2'. The micro-reproductions 3' are secured to the enamel 2' by a thin layer of adhesive 4'.

The sheet 21 functions in the same manner as the base member 1 of Figs. 1 and 2 in absorbing and dissipating heat from the micro-reproductions being projected; and the enamel 2' and the adhesive 4' are sufficiently thin that they do not appreciably impede the transfer of heat from the micro-reproductions to the sheet 21. When the intense light is concentrated on a small micro-reproduction, the resulting heat will be absorbed by the large surrounding portions of the sheet 21 and conducted away from the micro-reproduction rapidly enough to prevent any damage or injury thereto.

While the member 1 of Figs. 1 and 2 and the material 21 of Fig. 3 may be any material having high heat-conductive properties, as far as the absorption and dissipation of heat from micro-reproductions being projected is concerned, they will, when used in conjunction with a magnetic selector mechanism, be formed of steel or some other readily magnetizable material.

The micro-reproductions have been described above as being secured by a separately applied adhesive to the high heat-conductive base members 1 and 30 of Figs. 1 and 4, respectively, and sheet 21 of Fig. 5, but it is to be understood that any other known means of adhesive bonding may be used which will assure that the micro-reproductions are secured in good heat-conducting relationship to the heat-conductive base. For instance, when the micro-reproductions are micro-films or the like, they may be solvent-sealed to the base member. Also, it is to be understood that the surface of the base member may have sufficiently good light-reflecting properties, and therefore it may be unnecessary to coat the heat-conducting member with a material having good light reflectivity.

Various changes may be made in the details of the construction of the card without sacrificing any of the advantages of the invention or departing from the scope thereof as defined in the appended claims.

I claim:

1. A card for use in reflected-light projection comprising a member having high heat conductivity, a coating having high light reflectivity on the heat-conducting member, a plurality of transparent micro-reproductions secured to said coating in good heat-conducting relationship therewith, the area of each micro-film being very small compared with the area of said heat-conducting member.

2. A card as defined in claim 1, in which the transparent micro-reproductions are bonded to the heat-conducting member with a thin layer of an adhesive through which light may pass.

3. A card for use in reflected-light projection comprising a supporting member, a thin metallic layer secured thereto, a plurality of micro-reproductions to be projected adhesively bonded throughout substantially their entire area to said layer in good heat-conducting relationship therewith, the area of each micro-reproduction being very small compared with the area of said heat-conducting member.

4. A card as defined in claim 3, in which the metallic layer is aluminum foil.

5. A card as defined in claim 3, in which the micro-reproductions are bonded to the metallic layer by an adhesive having good light reflectivity.

6. A card for use in reflected-light projection comprising a supporting member, a thin layer of material having good heat conductivity secured thereto, a coating having high light reflectivity on said thin layer, a plurality of transparent micro-reproductions secured to said coating in good heat-conducting relationship therewith, the area of each micro-film being very small compared with the area of the surface of the heat-conducting member to which the transparent micro-reproductions are secured.

7. A card as defined in claim 6, in which the transparent micro-reproductions are secured to said coating by a thin layer of an adhesive having good light-transmitting properties.

8. A card as defined in claim 6, in which the transparent micro-reproductions are secured to said heat-conducting material by the light-reflective coating.

9. A card for use in reflected-light projection comprising a thin sheet of metal and a plurality of micro-reproductions to be projected adhesively bonded throughout substantially their entire area to said thin sheet of metal in good heat-conducting relationship therewith, the area of each micro-reproduction being very small compared to the area of said heat conducting member.

10. A card as defined and claimed in claim 9 in which the thin sheet of metal is hardened steel.

11. A card for use in reflected-light projection comprising a supporting member and a plurality of transparent micro-reproductions to be projected bonded throughout substantially their entire area to said supporting member in good heat-conducting relationship therewith by an adhesive which has good light reflectivity, at least the surface of the supporting member to which the micro-reproductions are adhesively bonded being metallic, the area of each micro-reproduction being very small compared with the area of said heat conducting member.

References Cited in the file of this patent

UNITED STATES PATENTS

| | | |
|---|---|---|
| 713,813 | Steutermann | Nov. 18, 1902 |
| 1,158,429 | Barton | Nov. 2, 1915 |
| 1,691,090 | Tevander | Nov. 13, 1928 |
| 1,888,054 | Tipecska | Nov. 15, 1932 |
| 2,260,551 | Boni | Oct. 28, 1941 |
| 2,326,042 | Lessman | Aug. 3, 1942 |